Sept. 10, 1968   D. D. JENSEN   3,400,649
VENTILATING SYSTEM INCLUDING FUME REMOVAL MEANS
Filed Jan. 26, 1967   3 Sheets-Sheet 1

DONALD D. JENSEN
INVENTOR

Huebner + Worrel
ATTORNEYS

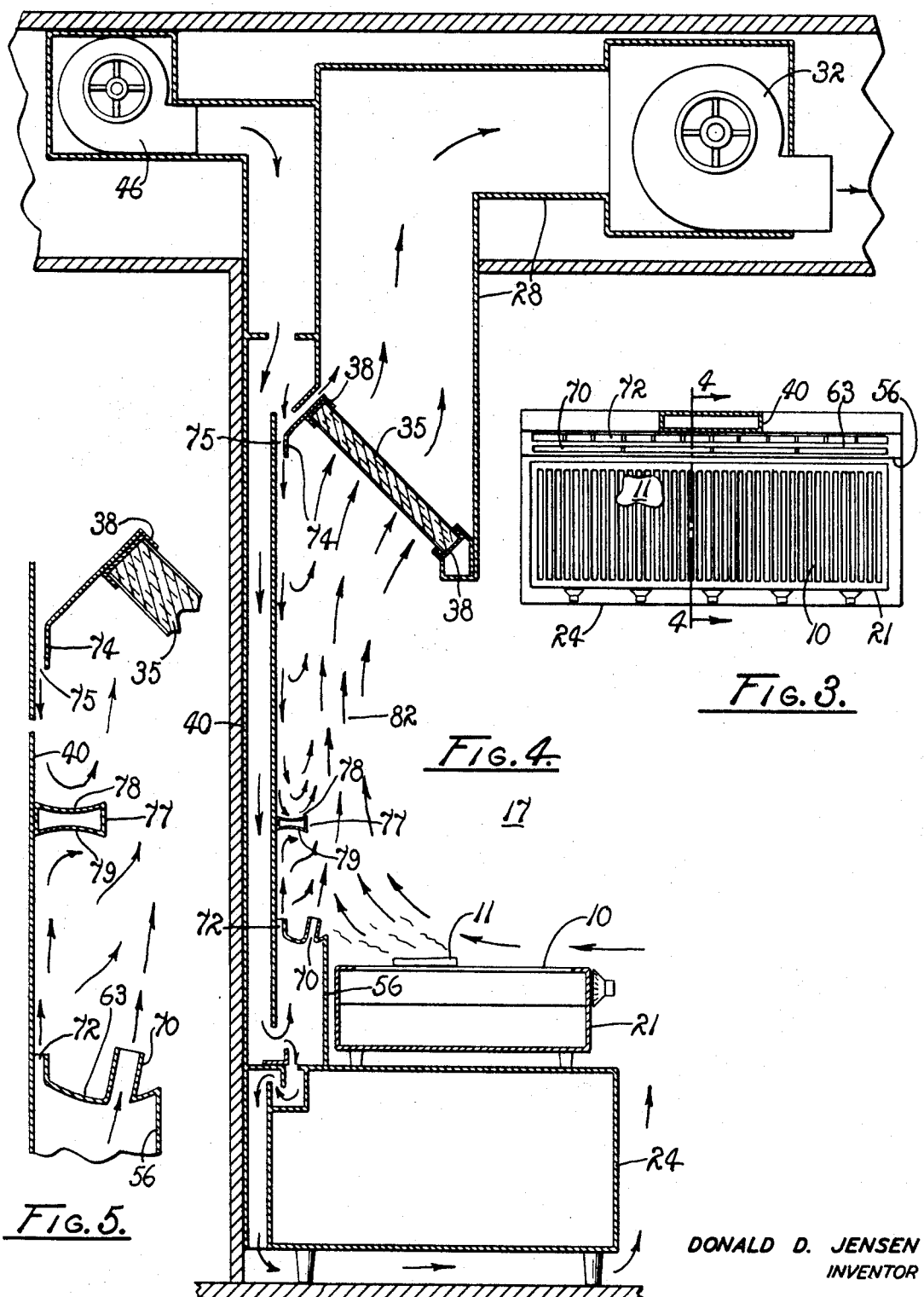

DONALD D. JENSEN
INVENTOR

Huebner & Worrel
ATTORNEYS

United States Patent Office 3,400,649
Patented Sept. 10, 1968

3,400,649
VENTILATING SYSTEM INCLUDING FUME REMOVAL MEANS
Donald D. Jensen, 3604 E. Butler, Fresno, Calif. 93702
Continuation-in-part of application Ser. No. 486,956, Sept. 13, 1965. This application Jan. 26, 1967, Ser. No. 617,759
13 Claims. (Cl. 98—115)

ABSTRACT OF THE DISCLOSURE

A ventilation system adapted to remove objectionable fumes, vapors and the like emitted from a localized zone, such as cooking ranges, laboratory tables and the like and having particular utility in conjunction with a heating unit installed in a closed room and being adapted to remove the fumes and vapors without substantially disturbing the ambient air surrounding said localized zone. Essentially, the system provides an air discharge aperture rearwardly adjacent to the heating unit which directs a relatively high velocity low pressure airstream upwardly into an exhaust stack above the heating unit to draw airborne impurities from the localized zone and to carry them into the stack.

Cross reference to related applications

The present invention is a continuation-in-part of my application Ser. No. 486,956, entitled "Ventilation System," filed Sept. 13, 1965 which is being abandoned in favor of the instant application. The present invention also represents a companion development to that described in my copending U.S. patent application, Ser. No. 319,728 filed Oct. 29, 1963, entitled "Ventilation System" and my application entitled "Apparatus and Method for Producing a Fog Curtain Heat Shield" mailed to the Patent Office Jan. 10, 1967.

Background of the invention

My above designated companion application, Ser. No. 319,728, provides a ventilation system which forms a moving wall of air between a cooking zone and personnel working adjacent to the zone so as to protect such personnel from excessive heat, cooking vapors and the like while removing fumes generated from the zone. However, it is sometimes desirable to locate any such air wall away from the front of a cooking zone so as to avoid obstruction thereof by personnel or utensils. Also, the physical layout of some cooking or fume-generating zones is such that other locations for the air wall may be more advantageous, as, for instance, in the case of cooking ranges of varying heights off a floor surface or of such ranges having elevational space limitations.

In ventilating buildings containing large cooking units it is customary to utilize exhaust systems which remove ambient air within the building along with the fumes and vapors and thus create undesirable air movement or drafts within buildings. In addition, air-conditioning systems in such buildings are required to handle appreciably higher temperature correcting loads than otherwise would be necessary, since the removed ambient air disrupts the temperature balance within the building, thus requiring additional removal or supply of heat to satisfy customary levels of human comfort, whether the season be winter or summer.

In exhaust systems which are employed to remove air laden with fumes containing an appreciable quantity of vaporized grease, the ambient air serving as the vehicle is normally not at a sufficiently low temperature to effect condensation of the grease in grease filters normally employed in such systems. Consequently, the vaporized grease escapes through the filters and subsequently condenses on the walls of the conduits in such exhaust systems. This condensed grease on the conduit walls constitues a major fire hazard, particularly in restaurant buildings.

As with my previous inventions, although the present ventilation system is particularly adapted to use with cooking ranges and is so described for illustrative convenience, it is to be understood that the present invention has utility with other types of localized fume-generating zones such as laboratory tables and the like. Throughout the specification and claims, the term "fumes" will be considered to include any air-borne substance regardless of its physical state, which may be either liquid, gaseous, or solid.

Accordingly, it is an object of the present invention to provide a ventilation system which removes grease, smoke, and other fumes emitted from a localized heating zone and materially reduces the fire hazard normally attendant exhaust systems employed for such purpose.

Another object is to provide a ventilation system which materially enhances the safety and comfort of personnel working in and around such localized heating zones as well as customers, guests and the like without obstruction of their work or of the ventilation system.

Another object of the invention is to provide a ventilation system for rooms which effectively removes objectionable fumes from a localized zone therein while minimizing total air and heat losses from within the room.

Another object is to provide a substantially closed circuit ventilation system having an air exhaust means to remove fumes from a localized zone and an air supply means to admit and direct air toward the zone, both the exhaust and supply means being in communication with a common sump.

Another object is to provide a ventilation system which minimizes removal of ambient air while systematically replacing any minimal air removed.

These, togther with other objects, will become more fully apparent upon reference to the following description and accompanying drawings.

Brief description of the drawings

FIG. 3 is a top plan view of a cooking range with a ventiliation system embodying a second form of the present invention.

FIG. 4 is a transverse vertical section through the range and ventilation system of the second form taken on line 4—4 of FIG. 3.

FIG. 5 is a somewhat enlarged fragmentary vertical section of the air discharge apertures of the second form of ventilation system.

Description of the preferred embodiments

Figure 1:
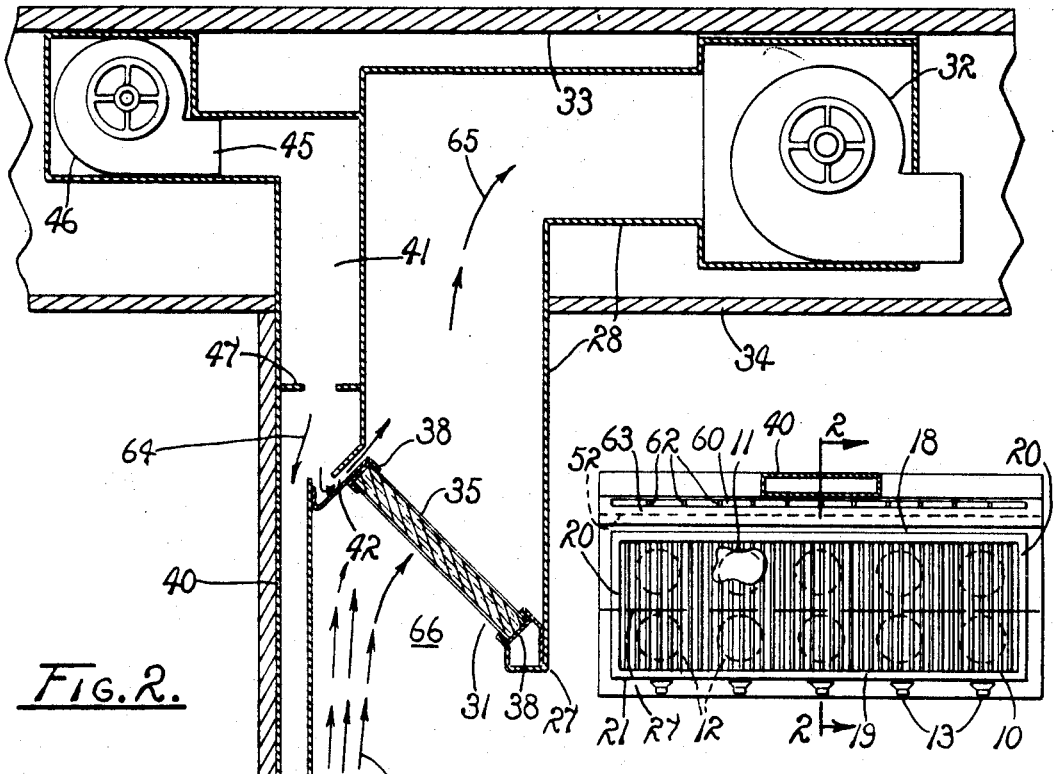
FIG. 1 is a top plan view of a cooking range with a ventilation system embodying the principles of the present invention associated therewith and shown in horizontal section.

Referring more particularly to the drawing, a localized heating unit in the form of a grill 10 provides a cooking surface adapted to support articles of food 11 thereon. Thermal energy is imparted to the food through the grill by means of any suitable type of contemporary heating unit, such as gas burners 12. The respective burners are selectively activated by manipulation of control valves 13. During the process of cooking, the gas burners as well as various elements of the food generate fumes and vapors 14 which are objectionable. The fumes are generated in a localized cooking zone 17 overlying the grill. The zone includes a central portion defined by a rearward edge 18, a frontal edge 19 and end edges 20. The grill forms part of a cooking range 21 preferably supported on a housing 24 which rests on a base or floor surface 25 adjacently of a wall 26, such as that of a kitchen.

An exhaust hood 27 is supported above the grill 10 and in spaced relation thereto to allow convenient access to the grill by cooks or other kitchen personnel, not shown. The exhaust hood consists of an exhaust stack or conduit 28 having an inlet 31 disposed above the zone 17, and extending therefrom upwardly and then horizontally to an air exhaust blower 32. The blower exhausts preferably to the outside atmosphere and is supported in any suitable manner such as by attachment to beams 33 or other overhead structure above a ceiling 34. The conduit is adapted to accommodate a volume flow of air at the capacity of the blower which is preferably sufficient to satisfy the desired air flow requirements for the system depending on the size of the cooking range 21 and amount of fumes 14 generated. The exhaust blower capacity or volume rate of flow in the described embodiment is aproximately 10,000 cubic feet per minute. A suitable air filter 35 is secured across the conduit inlet by means of retaining brackets 38 and is adapted to capture condensed grease vapors and the like from air passing therethrough at high velocity. The inlet portion of the conduit is shaped and oriented so as effectively to receive air directed theretowards, as shown in FIG. 3.

An air supply conduit 40 is disposed at the rear of the housing 24 preferably in an upright position to form a rear wall for the grill 10 forwardly of the wall 26, although other positions of the conduit relative to the wall are possible and entirely within the scope of the present invention. The upper portion of the conduit preferably forms an enlarged passageway 41 which extends through the ceiling 34 in juxtaposition to the exhaust conduit 28 and preferably in heat exchange relation therewith. A branch passageway 42 may be provided from the supply conduit to the exhaust conduit.

The upper end of the conduit 40 is connected to the discharge outlet 45 of an air supply blower 46 having a capacity sufficient to meet the desired air flow requirements. The capacity or volume rate of flow of the blower 46 in the embodiment is somewhat less than that of the blower 32, that is, approximately 9,000 cubic feet per minute. Accordingly, the pressure in the exhaust conduit 28 is slightly lower than the pressure in the air supply conduit 40 to compensate for the impedence of the flow of air imposed by the filter 35. Thus, the full volume of air from the air supply conduit flowing to the exhaust hood 27 is drawn through the filter with substantially no back flow or turbulence ahead of the filter. Such precise matching of the blowers further insures that only a relatively small amount of ambient air is withdrawn from the surrounding atmosphere. The blower 46 is supported in any suitable manner such as by attachment to beams 33 or other overhead structure above the ceiling. The supply blower is preferably disposed in communication with a source of fresh air, such as the outside atmosphere, or an air sump, not shown. Suitable baffles or guide vanes 47 may be supplied in the enlarged passageway 41 to direct the air flow from the blower, as required. A second branch passageway 48 may also be provided from the supply conduit to communicate with the air above the cooking zone 17.

The bottom portion of the air supply conduit 40 is conveniently secured to the housing 24 and provides a main outlet 49 and an auxiliary passageway 52 having an outlet 53 disposed for discharge of air into the ambient air surrounding the fume-generating zone 17 as, for instance, from beneath the housing, as shown in FIG. 1. The outlet is preferably elongated so as to extend along the entire length of the cooking range 21. The outlet may also be disposed adjacently of the grill 10 or the burners 12, if desired. The auixilary passageway includes an inlet opening 54, which also is elongated and is preferably of a smaller size than the outlet 53. The inlet opening has an adjustable lip 55 for selectively limiting the flow of air therethrough relative to that flowing through the main outlet 49.

Figure 2:
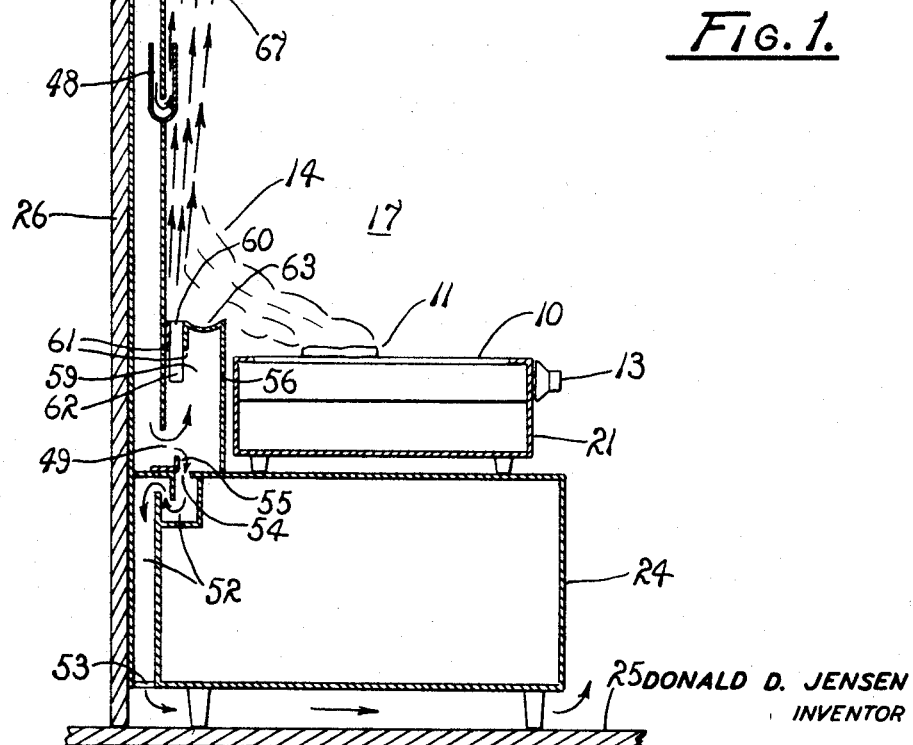
FIG. 2 is a transverse vertical section of the cooking range of FIG. 1 in operable association with the ventilation system thereof, taken in a segmented plane represented by line 2—2 of FIG. 1.

An elongated air distributing manifold 56 is mounted on the housing 24 between the air supply conduit 40 and the rearward edge 18 of the zone 17 at the rear of the grill 10 and is connected at its midsection to the air supply conduit 40 at the main outlet 49. The manifold has a distributing chamber 59 leading to a discharge aperture 60 at the rear marginal edge 18 of the zone 17. The aperture is formed by opposed lips 61 which may be made adjustable to allow selective variation of its cross sectional flow area, if desired. The aperture is oriented substantially towards the exhaust inlet 31 so as to direct flowing air theretowards. The air is directed preferably upwardly along the supply conduit and wall 26, as shown in FIG. 2, so as to allow placement of the exhaust hood 27 at a maximum height above the grill. However, the aperture may also be oriented for discharge of air at an angle away from the wall, if desired. Baffles 62 may be provided in the chamber for directing the air flow substantially in an upward direction without displacement longitudinally of the manifold.

The top surface of the manifold 56 provides a grease trap 63 along its entire length. The trap is adapted to catch grease droplets condensing from fumes 14 drawn into the air discharging from the aperture 60.

Operation of the first form

The operation of the first form of the present invention is believed to be readily apparent and is briefly summarized at this point. Items of food 11 are disposed on the grill 10 and heated to a cooking temperature, whereupon they proceed to exude fumes and vapors 14 in levitational dispersion. The blowers 32 and 46 are activated. A moving stream of air 64 commences to flow downwardly through the air supply conduit 40 to the main outlet 49, from whence it is distributed along the manifold distributing chamber 59 for continuous discharge through the discharge aperture 60. At the same time, an upwardly moving stream of air 65 is generated in the exhaust conduit 28. The resultant reverse flows of air through the respective juxtaposed conduits provide heat exchange between the respective airstreams at a rate dependent on the degree and longitudinal extent of juxtaposition. The heat exchange serves to warm the air supply to a moderate degree to coolness when drawn in from the outside atmosphere during cold weather periods, thereby eliminating the need for an air heater to prevent frosting of the supply conduit 40 and related surfaces. During hot weather periods, if it becomes undesirable to heat the air supply, such heat exchange may be eliminated by installation of sufficient insulation, or controlled by making use of apparatus such as is described in my above designated copending application. However, hot weather temperatures are not usually so extreme as to impair effective operation of the system.

The upwardly moving exhaust stream 65 causes a suction pressure to form in the area 66 beneath the exhaust hood 27, which draws the discharging air from the discharge aperture 60 upwardly through the air filter 35 into the exhaust stream. By suitable control of the blowers so as to balance the rate of exhaust flow with that of supply flow, a continuous low pressure area is maintained at the exhaust inlet so as to insure uninterrupted air flow, as described.

As the air passes downwardly through the air supply conduit 40, a major portion of the supply stream passes into the manifold 56 and is directed upwardly through the discharge aperture 60. However, a smaller portion continues downwardly through the auxiliary passageway 52 to discharge through the outlet 53 and to mix with the ambient air. By adjusting the lip member 55, the passageway inlet 54 can be varied in size so as to control the volume of air discharging through the auxiliary passageway. This auxiliary or secondary make-up air is thereby released into the ambient atmosphere in such a way as to enhance the beneficial performance of the ventilation system. The make-up air either replaces or is substituted for any ambient air which might be unavoidably drawn into the exhaust stream 65 or into the air discharging through the aperture 60 and thereby prevents fluctuations in the ambient air temperature and minimizes the heat or cooling load required of the overall air-conditioning system in the building, not shown. The make-up air may be discharged proximally of the grill 10 to improve cooking conditions as necessary, to cool hot surfaces of the range 21, or to supply needed oxygen for the cooking burners 12, or it may be discharged as shown in FIG. 2. Location of the make-up discharge may depend on the ventilation requirements of a particular system or upon the temperature of the outside air supply. By selective adjustment of the air flow through the respective blowers 32 and 46 in relation to the proportionate air flow through the discharge aperture and auxiliary outlet, the cooking fumes are removed by an independent supply of air and the ambient air is thereby maintained at substantially constant temperature without effecting the operation of the over-all air-conditioning system.

The air flowing from the discharge aperture 60 to the exhaust conduit 28 forms a continuously flowing air wall or carrier stream 67 having everywhere a lesser pressure than the air overlying the cooking zone 17. As a result, the overlying air containing the fumes and vapors 14 is drawn into the flowing air wall to pass upwardly into the exhaust conduit. The temperature of the air in the carrier stream is substantially the temperature of the source of air drawn through the blower 46, which may be maintained sufficiently cool to cause condensation of gaseous fumes generated during the cooking process, regardless of the higher temperatures of the air overlying the cooking zone 17. Consequently, effective functioning of the air filter 35 is assured. Air flowing through the branch passageway 42 at high velocity serves to boost the upward flow of air by creating a supplementary low pressure area within the hood 27.

The lower pressure of the high velocity stream 67 as it discharges through the aperture 60 is such that the fumes 14 are drawn into the stream above the grease trap 63. Relatively heavier droplets of grease condensed from the fumes thereupon fall immediately into the trap and are prevented from splattering the adjacent surfaces or clogging the air filter 35.

Although the airstream 67 may be discharged directly toward the exhaust hood 27, its discharge directly upwardly, as shown in FIG. 2, provides the additional advantage of effectively air-washing the wall 26 behind the cooking range 21 and thereby minimizing any collection of grease therealong. The low pressure area 66 created by the exhaust blower 32 insures the suction of the air wall into the exhaust hood. The suction force is enhanced by air discharging through the branch passageway 48 at relatively high velocity so as to accelerate the upward flow of the airstream in the exhaust hood.

*Second form*

A second form of ventilation system embodying the principles of the present invention is shown in FIGS. 3 through 5. The second form is basically similar to the above described first form and is utilized in connection with the same heating unit or grill 10. Accordingly, all elements common to the first and second forms of the invention are provided with the same reference numerals. The structure of the second form is intended primarily to insure that there is substantially no accumulation of impurities on the rear wall of the heating unit formed by the inlet air supply conduit 40. This is accomplished by modifying the first form of the invention to provide auxiliary streams of air in sweeping relation against the rear wall.

As best shown in FIGS. 4 and 5, the inlet air distributing manifold 56 is modified to include an elongated main or primary discharge aperture 70 in upwardly extended relation from the manifold from a point formerly occupied by the grease trap 63 of the first form. It is noted that such positioning disposes the discharge aperture in spaced relation to the rear wall of the heating unit formed by the inlet air conduit 40 and in somewhat more closely spaced relation to the rear marginal edge 18 of the localized zone 17. It is further noted that the primary air discharge aperture is somewhat angularly related from an upright plane so as to be pointed substantially directly at the inlet 31 of the exhaust stack 28.

The discharge aperture 60 of the first form is replaced in the second form by a somewhat more restricted lower auxiliary discharge aperture 72 formed in the air distributing manifold in closely spaced relation to the rear wall of the heating unit formed by the inlet air supply conduit 40. It is noted that the primary air discharge aperture 70 and the lower auxiliary discharge aperture are sufficiently spaced to incorporate the grease trap 63 of the first form therebetween. A depending elongated lip 74 is extended from the upper most retaining bracket 38 for the air filter 35 in closely spaced substantially parallel relation to the upper portion of the rearward wall of the heating unit. An upper auxiliary discharge aperture 75 is thereby formed between the lip and the rearward wall of the heating unit for directing a downward flow of air in sweeping relation along the rearward wall in adjacent counter-flowing relation to the primary airstream 67 from the discharge aperture 70.

A combined air deflector and grease trap 77 is mounted in forwardly extended relation on the rearward wall of the heating unit in upwardly spaced relation to the lower auxiliary discharge aperture 72. The deflector has opposite upper and lower concave surfaces 78 and 79, respectively, which are disposed in blocking, turning relation to the respective airstreams of the upper and lower auxiliary air discharge apertures.

*Operation of the second form*

The operation of the second form of the present invention is similar to the operation of the first form with respective to the food items 11 on the grill exuding fumes and vapors 14 into the localized zone 17. Upon actuation of the blowers 32 and 46, air is discharged in a continuous stream to form a high velocity, low pressure air wall 82 which is drawn into the exhaust stack through the filter 35 by the exhaust blower 32. As before, the capacity of the blowers is such that a differential in pressure is created in the exhaust stack sufficently to insure that the impedence on the flow of air provided by the air filter is sufficiently overcome to preclude any significant backflow or turbulence of air ahead of the filter and to minimize the withdrawal of ambient air from the room in which the heating unit is located. As before, the overlying air containing the fumes and vapors 14 in the zone 17 is drawn across the grill 10 and into the low pressure air wall 82. Accordingly, any air-borne impurities generated during the cooking process are carried by the air wall upwardly into the exhaust stack 28.

Concurrently with the discharge of the air from the primary air discharge aperture 70, a supplemental flow of air is concurrently discharged from the upper and lower auxiliary discharge apertures 72 and 75. Such supplemental airstreams are directed in sweeping relation against the rearward wall of the heating unit to sweep away any impurities which may have condensed and dropped out of the primary air wall 82. The supplemental airstreams are deflected from their rectilinear paths of travel by the deflector 77 which turns them into the primary air wall 82. Accordingly, any impurities which splatter or drop toward the rearward wall of the heating unit are swept into the supplemental airstreams and are carried into the primary air wall of upward movement therewith into the exhaust stack 28.

*Third form*

Figure 6:
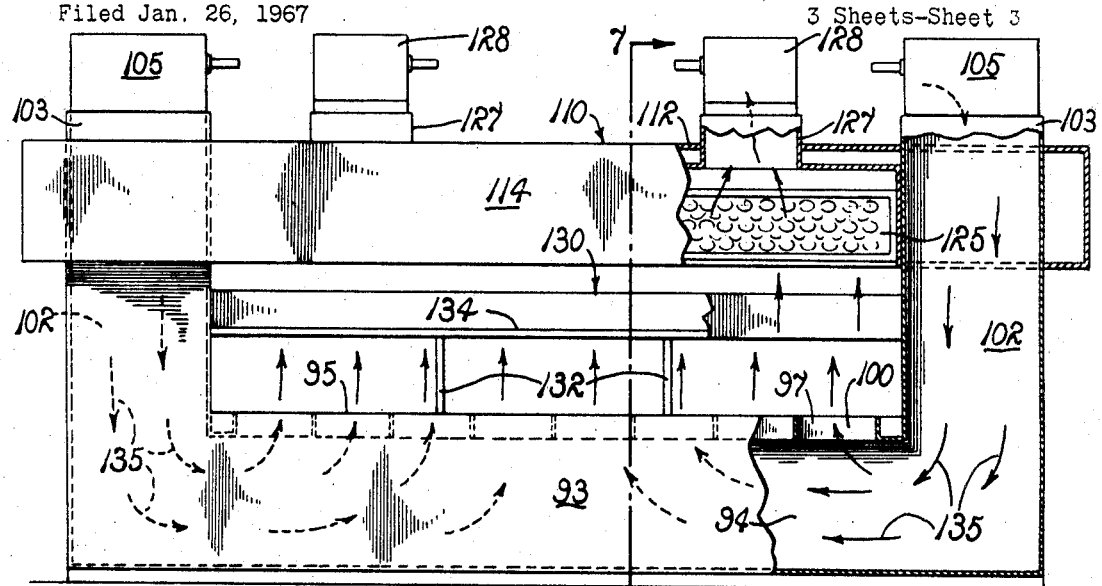
FIG. 6 is a top plan view of a cooking range with a ventilation system embodying a third form of the present invention with portions broken away for illustrative convenience.
Figure 7:
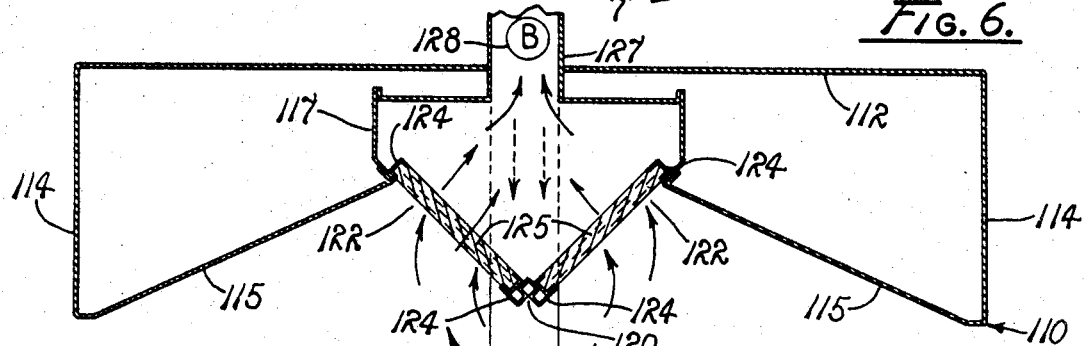
FIG. 7 is a transverse vertical section through the range and ventilation system of the third form taken on line 7—7 of FIG. 6.

A third form of ventilation system embodying the principles of the present invention is shown in FIGS. 6 and 7. This form of the invention is shown specifically adapted to a heating unit providing a pair of grills 85 disposed in back-to-back relation on opposite sides of a hollow partition wall 86. The grills 85 are substantially identical to the grills 10 of the first and second forms and include fume-generating zones 88 in overlying relation to their respective grills. While the third form of the present invention is described in connection with a pair of grills 85, it is readily apparent that the structure may be adapted to single-grill installation in which the rearward wall 26 is entirely eliminated or spaced from the heating unit.

The grills 85 individually include rearward marginal edges 90 which are disposed in spaced relation on opposite sides of the partition wall 86 and opposite front marginal edges 92. The partition wall 86 includes opposite walls 93 which define therebetween an elongated air distributing manifold 94. The opposite walls provide upper edges 95 which terminate immediately above the rear marginal edges 90 of the grills and between which is mounted a pair of baffles 97. The baffles are spaced from each other and are formed to define an elongated venturi discharge aperture 100 therebetween. The distributing manifold includes substantially upright oppoiste air supply ducts 102 having upper ends 103. A pair of inlet air blowers 105 are mounted on the upper ends of the ducts for connection to a supply of fresh air externally of the room in which the heating unit is located.

An elongated exhaust hood 110 is extended between the upper ends 103 of the distributing manifold 94 in elevated position above the grills 85. The hood includes an upper wall 112, depending opposite front walls 114, and upwardly converging lower walls 115. An elongated exhaust collecting conduit 117 is mounted between the lower walls and provides a downwardly spaced centrally disposed rail member 120 forming a pair of opposite inlet openings 122 into the exhaust conduit. A pair of sets of inwardly facing channular brackets 124 are respectively mounted on the rail member 120 and on the lower walls 115 individually to mount a pair of air filters 125 across the openings 122.

A pair of longitudinally spaced exhaust stacks 127 are upwardly extended from the exhaust conduit 117. Each of the stacks mounts an exhaust blower 128 to create a low pressure within the exhaust conduit and to direct a flow of air outwardly from the room in which the heating unit is located. An elongated airstream guide box 130 is mounted at its ends between the ducts 102 of the air distributing manifold 94 and is supported intermediate its ends in spaced substantially parallel relation above the partition wall 86 by a pair of supports 132. The guide box further provides opposite outwardly extended shelf portions 134 disposed in over-hanging relation with respect to their respective grills 85.

*Operation of the third form*

Upon actuation of the blowers 105 and 128, a supply of air is directed downwardly through the ducts 102 and into the distributing manifold 94 in the direction of the arrows 135. Such air moves upwardly through the venturi discharge aperture 100 at a relatively high velocity in a continuous low pressure airstream indicated by the arrows 136. The airstream is directed substantially vertically upwardly through the guide box 130 and is divided by the rail 120 for concurrent passage through the air filters 125 and into the exhaust conduit 117. As in the previous forms of the present invention, the exhaust conduit is maintained by the exhaust blower 128 at a somewhat reduced pressure to draw the airstream through the filter with a minimum of turbulence in the airstream and without drawing any substantial amount of ambient air from the surrounding atmosphere. The low pressure airstream 136 creates a draft across the grills 85 which is indicated by the arrows 138 for carrying any impurities in the localized fume zones 88 into the airstream for movement therewith into the exhaust conduit 117.

From the foregoing, it is readily apparent that a ventilation system has been provided which effectively removes objectionable food fumes from a localized zone within a closed building while minimizing total air and heat or cooling losses. The system has a simple and economical design and is adapted for convenient and efficient operation.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In combination with a cooking grill or the like having means which produces airborne impurities and which has a predetermined rear marginal edge, a front marginal edge open to the ambient air, and a substantially vertical rear wall upwardly extended from said rear marginal edge; a ventilation system comprising a power driven blower supplying air under pressure, a conduit connected to the supply blower providing a constricted discharge aperture disposed adjacent to the rear marginal edge of said means and upwardly directed along the wall to discharge a substantially vertical airstream of sufficient velocity to create a venturi effect drawing air across said means from the front marginal edge thereof, a power driven exhaust blower having an intake creating a suction, and an exhaust conduit connected to the intake of the exhaust blower providing an intake end disposed in spaced relation above the aperture in substantial alignment therewith whereby a path of continuous air flow at a pressure less than the ambient air pressure is established from the aperture to the intake end of the exhaust conduit.

2. The ventilation system of claim 1 wherein said conduit connected to the supply blower includes an auxiliary passageway connected to the conduit having an outlet disposed for discharge of air into the ambient air externally of the zone to replace ambient air drawn into the airstream across said zone; and the discharge aperture is in a discharge manifold connected to said conduit, at least one of said outlet and said aperture being adjustable so as to regulate the flow through the outlet relative to the discharge of air through said discharge aperture.

3. The ventilation system of claim 1 wherein the air supply blower and air exhaust blower are adapted respectively to generate predetermined volume rates of air flow, and wherein air discharging from the discharge aperture forms a carrier stream coextensively with the zone having a low pressure relative to the pressure in said zone and being adapted to receive fumes from said zone and to carry fumes to said exhaust conduit.

4. The combination of claim 1 including orifice means connected to the supply blower directing a layer of air downwardly along the wall between said path of upwardly moving air and the wall.

5. The combination of claim 1 in which the wall has upper and lower edges, the wall defines a part of the conduit connected to the supply blower, said conduit provides a downwardly directed orifice at the upper edge of the wall to direct an auxiliary layer of air downwardly along the wall between said path of upwardly moving air and the wall and said conduit provides an auxiliary upwardly directed orifice between said aperture and the wall to direct an auxiliary layer of air upwardly along the wall between said path and the wall.

6. The combination of claim 5 in which a deflector is mounted on the wall and extended toward said path of air in upwardly spaced relation to the grill against which the upwardly and downwardly moving auxiliary layers of air impinge and are deflected outwardly of the wall into said path.

7. A ventilation system adapted to remove fumes generated from a localized zone, the zone having a rear marginal edge, a front marginal edge and a central portion, comprising support means; air supply means having an air blower; an elongated air manifold mounted on said support means and providing an elongated air discharge aperture disposed between said air supply means and said rear marginal edge of the zone and substantially coextensive therewith for discharge of air upwardly of said zone, said manifold having a midsection longitudinally thereof; a conduit connecting the air supply means to the manifold substantially at said midsection and in air communication therebetween; air exhaust means including an air blower means adapted to produce a predetermined volume rate of flow; and an air exhaust conduit connected to said exhaust means and having an inlet disposed superiorly of said zone in a position to receive air directed from the air discharge aperture, said air supply means being adapted to produce an airstream discharging through said aperture and proceeding upwardly coextensively in direct communication with the zone and into the exhaust conduit inlet at a velocity sufficient to create a low pressure in said stream relative to the pressure in said zone and thereby to draw air from the zone into the stream.

8. The ventilation system of claim 7 including an auxiliary air passageway leading from the conduit connected to the manifold and associated in air communication with said conduit, said passageway having an outlet disposed at a selected location relative to the zone for discharge of air into the ambient air surrounding the system.

9. A ventilation system for removing airborne impurities from a localized zone having a rear marginal edge and a front marginal edge along which the zone is open to the ambient air; comprising a stack mounted in upwardly spaced relation to the zone; and air supply means forming a substantially upright wall in spaced relation from said rear marginal edge of the zone and having main air discharge aperture means disposed immediately adjacent to said rear marginal edge of the zone in spaced relation from the wall, a lower auxiliary aperture immediately adjacent to the wall in spaced relation to said main aperture, and an upper auxiliary aperture disposed immediately adjacent to the wall and to said stack, said main aperture means being adapted to discharge a continuous low pressure primary stream of air upwardly in direct communication with said zone entirely between said rear marginal edge of the zone and said stack to draw air inwardly of the front marginal edge of the zone and to carry air-borne impurities up the stack with said upper and lower auxiliary apertures being adapted to discharge opposed supplementary airstreams in sweeping relation along said wall to preclude accumulation of impurities thereon and to carry such impurities into the primary airstream.

10. The ventilation system of claim 9 including deflector means borne by the wall in the path of said supplementary airstreams to deflect them into said primary airstream.

11. A ventilation system including a pair of substantially horizontal means which are sources of air-borne contaminants which have rear marginal edges disposed in spaced substantially parallel relation and opposite front marginal edges, an exhaust conduit mounted in upwardly spaced relation to said source means, and air supply blower means disposed between said zones for directing an airstream upwardly from a position immediately adjacent to said rear marginal edges of the source means and into said exhaust conduit at a velocity sufficient to create a continuous low pressure air wall therebetween to draw air inwardly of the front marginal edges of the zones and to carry air-borne impurities up the exhaust conduit.

12. The ventilation system of claim 11 in which said air supply means comprises an elongated conduit having a venturi discharge aperture disposed elevationally adjacent to said rear marginal edges of the source means, and guide means disposed elevationally between said aperture and said exhaust conduit to constrain said airstream in its upward path of travel toward the exhaust conduit.

13. In combination with a cooking grill or the like having a localized zone which produces air-borne impurities and which has a predetermined rear marginal edge and a front marginal edge open to the ambient air, a ventilation system comprising means for supplying air under pressure, a conduit connected to the air supplying means providing a constricted discharge aperture disposed adjacent to the rear marginal edge of the zone and upwardly directed to discharge a substantially vertical airstream of sufficient velocity to create a venturi effect drawing air across said zone from the front marginal edge thereof, means for exhausting air having an intake adapted to create a suction, and an exhaust conduit connected to the intake of the exhaust means providing an intake end disposed in spaced relation above the aperture in substantial alignment therewith whereby a path of continuous air flow at a pressure less than the ambient air pressure is established from the aperture to the intake end of the exhaust conduit.

References Cited

UNITED STATES PATENTS

| 1,732,315 | 10/1929 | Ray | 98—115 |
| 2,532,420 | 12/1950 | Pledger | 126—299 |
| 2,664,808 | 1/1954 | Peterson | 98—115 X |
| 2,868,108 | 1/1959 | Petersen | 98—115 |
| 2,874,627 | 2/1959 | Simmonds | 98—115 |
| 3,130,661 | 4/1964 | Fischer | 98—115 |
| 3,285,154 | 11/1966 | De Rosa | 98—115 |
| 3,303,839 | 2/1967 | Tavan | 126—299 |

ROBERT A. O'LEARY, *Primary Examiner.*

M. A. ANTONAKAS, *Assistant Examiner.*